United States Patent Office 2,969,280
Patented Jan. 24, 1961

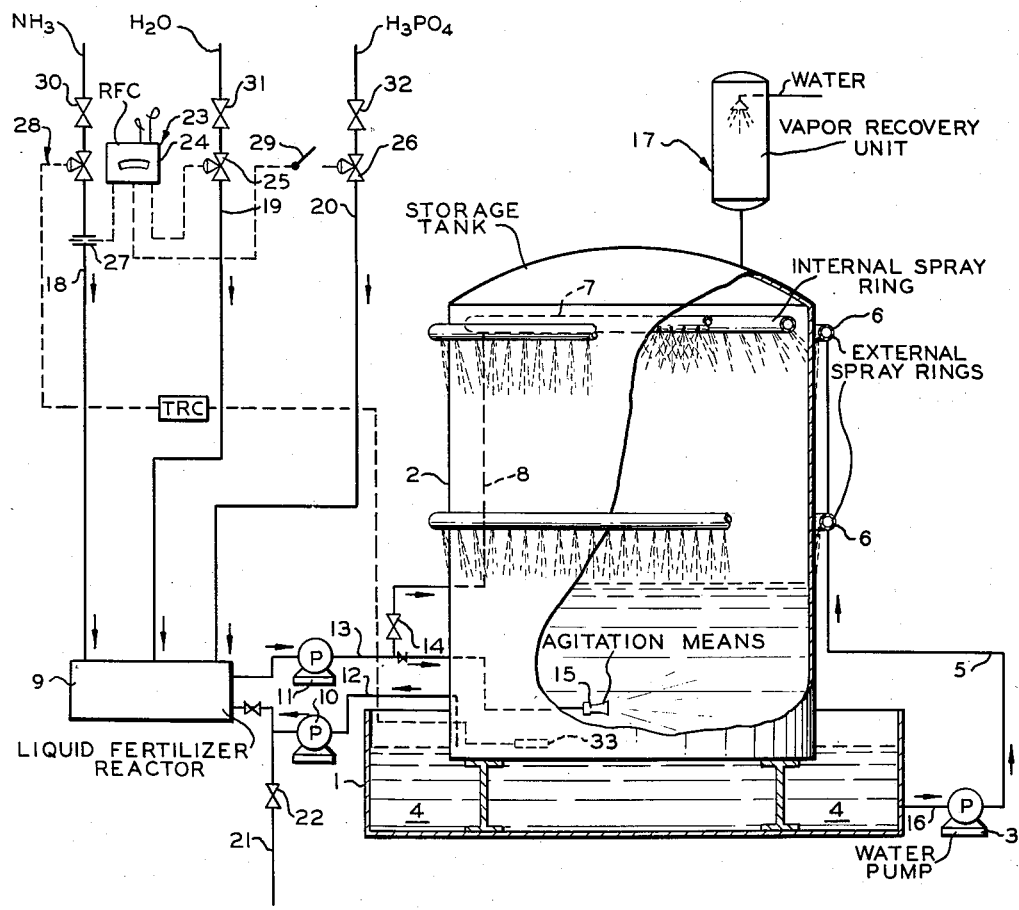

2,969,280

PROCESS AND APPARATUS FOR PRODUCING COOLED AQUEOUS AMMONIUM PHOSPHATE FERTILIZER

Alvin W. Peck, Bartlesville, Okla., assignor to Phillips Petroleum Company, a corporation of Delaware Filed June 28, 1956, Ser. No. 594,469

4 Claims. (Cl. 71—41)

This invention relates to apparatus and a method for the production of liquid fertilizers. In one aspect it relates to an apparatus and a method of reaction of a liquid reactant with at least one other reactant with the evolution of heat of reaction for the production of liquid fertilizers whereby the reaction products become heated. In another aspect it relates to apparatus and a method for producing a cooled fertilizer product from a pair of reactants which evolve heat upon mixing.

My invention has special application in a liquid fertilizer field in which liquid ammonia is mixed with water to produce aqueous ammona and in the production of aqueous ammonium phosphate by the addition of phosphoric acid and ammonia to water. In the production of both aqueous ammonia and aqueous ammonium phosphate, considerable quantities of heat are evolved and in aqueous solution containing free ammonia temperatures should be maintained as low as possible to avoid loss of ammonia during handling of the products.

The production of aqueous ammonia from water and anhydrous ammonia, and aqueous ammonium phosphate from water, ammonia, and phosphoric acid, in large commercial plants exhibits few cooling problems because a supply of ample cooling and refrigeration is ordinarily available. However, in case a dealer wishes to stock anhydrous ammonia, or anhydrous ammonia and phosphoric acid separately and then produce aqueous ammonia or aqueous ammonium phosphate as needed, the problem of refrigerating or cooling the produced aqueous ammonia and the aqueous ammonium phosphate is a real one. Ordinarily under this latter condition, plant type refrigeration is not available, nor is the capital investment to construct it warranted.

According to my invention, I have devised an apparatus which is relatively inexpensive to construct and simple to operate to produce such products sufficiently cool for storage and handling without undue vaporization loss.

An object of my invention is to provide an apparatus in which to produce liquid fertilizer products, which become heated by exothermic reaction during production, sufficiently cool for storage and handling.

Still another object of my invention is to provide such an apparatus which requires only a low capital investment for construction and requires low maintenance costs.

Yet another object of my invention is to provide a process for producing such liquid fertilizers in a sufficiently cool condition for storage and handling.

Yet another object of my invention is to provide a method for producing and cooling aqueous ammonia from anhydrous ammonia and water, and aqueous ammonium phosphate from anhydrous ammonia, phosphoric acid and water, and aqueous ammonium phosphate containing an excess of ammonia over that required to produce triammonium phosphate and to cool these aqueous solutions to such temperature as to minimize evaporation of ammonia during subsequent storage and handling.

Still other objects and advantages of my invention will be realized upon reading the following description which, taken with the attached drawing, forms a part of this specification.

The drawing illustrates one embodiment of apparatus parts suitable for carrying out the process of my invention.

Aqueous ammonia fertilizer is produced according to my invention having any desired concentration of ammonia. In some agricultural areas aqueous ammonia is injected into the soil by movable apparatus resembling cultivators equipped with tubular means for injecting the aqueous ammonia below the surface of the ground. In areas which are irrigated it is convenient to add the aqueous ammonia to the irrigation water for application to the soil. According to my invention, I produce aqueous ammonia from anhydrous ammonia in any desired and suitable concentration for application to the soil. Similarly, I also produce aqueous ammonium phosphate fertilizer with or without an excess of ammonia over that required to produce triammonium phosphate for application to the soil by mechanical device or by irrigation water.

Broadly, my liquid fertilizer converter and cooling system comprises in combination a tank, a chemical reaction vessel, a first conduit communicating said reaction vessel and said tank, a first spray means for spraying the inner walls of the tank, a second spray means for spraying the outer walls of the tank, a second conduit communicating said first conduit and said first spray means, means for flowing liquid from said reaction vessel into said first conduit and means for passing cooling water from a source to said second spray means.

Furthermore, my process for producing a cooled liquid fertilizer from reactants which when mixed evolve heat comprises mixing said reactants in a first zone whereby heat is evolved and the reaction product acquires a higher temperature than that of said reactants, flowing the reaction product down the inner wall of a second zone, and flowing cooling water down the outer wall of said second zone whereby said reaction product in said second zone becomes cooled. In one embodiment I also pass cooled reaction product from the second zone into the first zone to cool the mixing reactants in the first zone.

Referring now to the drawing, reference numeral 1 identifies a sump or tank containing a body of water 4. A tank 2 is suitably supported within tank 1 so that the bottom of the tank 2 can be contacted with the water for heat exchange purposes. Disposed around the outer periphery of tank 2 at an elevation adjacent its top is at least one external spray ring 6. If desired, two or more external spray rings 6 can be provided. In the drawing I have illustrated two of these external spray rings. A pump 3 draws water from tank 1 through a pipe 16 and transfers it through a pipe 5 to spray rings 6. These spray rings are so disposed around the outer periphery of the tank that water being sprayed therethrough contacts the wall of the tank and flows downwardly in as nearly a uniform sheet of water as possible. This downflowing water of course is received by the tank 1.

A chemical reaction vessel 9 is, if desired, a tube of suitable diameter into which communicate reagent inlet conduits 18, 19, and 20. A conduit 12 communicates tank 2 by way of pump 10 with the chemical reaction vessel 9. A second conduit 13 communicates the chemical reaction vessel with the tank 2. Conduit 13 is provided with a pump 11. A pipe 8 containing a valve 14 is connected with pipe 13 as illustrated. Pipe 8 extends upward and communicates with a spray ring 7 disposed around the inner wall of tank 2 at a level near its top.

The spray rings 6 and the spray ring 7 need not specifically be rings, but the spray apparatus can be spray nozzles or other suitable spray producing apparatus so disposed as to spray water on the outside of the tank and chemical solution on the inside of the tank to provide as nearly uniform sheets of down-flowing liquid as possible. Conduit 13 as illustrated extends through the wall of tank 2 and is provided with an agitation means 15 suitable for mixing or otherwise agitating the liquid contents of the tank so as to maintain as nearly uniform temperature as possible.

A vapor recovery unit 17, including a water spray, is provided in communication with the space of tank 1 normally containing vapor so as to prevent escape of volatile components to the atmosphere.

The chemical reaction vessel as mentioned is provided with inlet conduits 18, 19, and 20 for inlet of fertilizer producing components. As illustrated, conduit 18 is intended for the introduction of anhydrous ammonia, conduit 19 for the introduction of water, and conduit 20 for the introduction of phosphoric acid. For ease of control of this system a temperature recorder controller apparatus 28 includes a temperature responsive device 33, such as a thermocouple or other suitable device, motor valve in conduit 18 and a recorder-controller element. Such a temperature recorder-controller assembly is well known in the art and can be set to operate a valve to regulate the flow of liquid in pipe 18 in response to changes in the temperature as indicated by the temperature responsive device 33. According to my operation, when the temperature of the liquid contents of tank 2 reaches a predetermined high temperature the control apparatus 28 operates to throttle its valve and restrict the flow of anhydrous ammonia in conduit 18. Conversely, when the temperature of the liquid contents of the tank 2 reaches a predetermined low level, the recorder controller apparatus operates to open the motor valve in conduit 18 to allow flow of ammonia at a greater rate. A rate-of-flow controller assembly 23 is also provided for regulating the rate of flow of water in conduit 19, or the rate of flow of water in conduit 19 and the rate of flow of phosphoric acid in conduit 20 in response to the rate of flow of ammonia in conduit 18. This rate of flow controller apparatus 23 includes an orifice member 27 disposed in conduit 18, a motor valve 25 in conduit 19, a motor valve 26 in conduit 20, and a flow responsive controller 24 including, if desired, recorder apparatus.

For the production of, for example, triammonium phosphate of a given concentration as an aqueous solution, it is realized that the three ingredients should be introduced into the chemical reaction vessel in a definite ratio, and, as illustrated in the drawing, my apparatus provides for the regulation of the rate of introduction of water, and of phosphoric acid in response to the rate of flow of anhydrous ammonia through the orifice 27.

If desired, however, these several rates of material flow can be regulated manually as by valves 30, 31, and 32. The controller 24, if desired, can be supplied with the apparatus for the discontinuance of operation of motor valve 26 when it is desired to produce only aqueous ammonia. However, if desired, a switch 29 is illustrated to break the circuit from apparatus box 24 to motor valve 26.

Pipe 21, provided with a valve 22, is supplied for withdrawal of finished product from the storage tank 2.

In the operation of this apparatus, for example for the production of aqueous ammonia, the water and ammonia are supplied through the conduits 19 and 18, respectively, and pump 11 pumps this liquid through conduit 13 with a portion entering tank 2 by way of the agitation means 15 for stirring the contents of the tank and the remainder passing through pipe 8 to spray ring 7 for flowing down the inner wall of the tank. Cooling water from tank 1 is also pumped by pump 3 to spray ring or rings 6 for flowing downward on the outer wall of the tank and in indirect heat exchange relation with the downflowing aqueous ammonia on the inner wall of the tank.

The operation of the apparatus for the production of aqueous ammonium phosphate with or without an excess of free ammonia is substantially the same as that just described relative to the production of aqueous ammonia with the exception that phosphoric acid is added to the aqueous ammonia in the reactor 9 via pipe 20.

In one example of the utility of my invention 5½ tons per hour of aqua ammonia are produced and cooled in a 10,000 gallon tank with aqua ammonia spray on the inside walls and water spray on the outer walls with a temperature difference between the liquid contents of the tank and the atmosphere being approximately 40° F.

By maintaining the temperature of liquid aqua ammonia contents of a 10,000 gallon tank (10 feet diameter by 18 feet high) within 10° F. above atmospheric, 1,600 pounds of 25 percent aqueous ammonia are produced and cooled per hour.

This invention is used for other application than those specifically disclosed; for example, it is used for preparation of ammonium nitrate from ammonia and nitric acid, with or without an excess of ammonia.

While certain embodiments of my invention have been described for illustrative purposes the invention obviously is not limited thereto.

I claim:

1. A process for producing a cooled aqueous ammonium phosphate fertilizer comprising separately introducing liquid ammonia, water and phosphoric acid in a first zone and therein mixing these materials whereby the produced aqueous ammonium phosphate becomes heated to a higher temperature than the temperature of the ammonia, water and phosphoric acid prior to mixing, dividing this heated aqueous ammonium phosphate into two portions, flowing one portion down the inner wall of a second zone, flowing cooling water down the outer wall of said second zone in indirect heat exchange with the downflowing aqueous ammonium phosphate whereby the downflowing aqueous ammonium phosphate becomes cooled to a temperature intermediate the temperature of the original ammonia, water and phosphoric acid and said higher temperature, injecting the other portion of said heated aqueous ammonium phosphate into the cooled aqueous ammonium phosphate in said second zone thereby agitating same, further cooling the agitated contents of said second zone by indirect heat exchange with a body of cooling water through the bottom of said second zone, passing a portion of the further cooled, agitated liquid contents of said second zone into said first zone to minimize said higher temperature, regulating the rate of introduction of liquid ammonia into said first zone in response to temperature of the liquid contents of said second zone, regulating the rates of introduction of water and of phosphoric acid into said first zone in predetermined ratios with respect to the introduction of said ammonia into said first zone, and withdrawing the remainder of the further cooled, agitated liquid contents of said second zone as product.

2. A liquid fertilizer converter and cooling assembly comprising, in combination, a tank, a chemical reaction vessel, a first conduit for communicating said tank and said vessel, a second conduit communicating said tank and said vessel, a first spray means for spraying the inner walls of said tank, a second spray means for spraying the outer wall of said tank, a third conduit communicating said second conduit and said first spray means, means for flowing liquid from said reaction vessel through said second conduit into said third conduit, means for passing cooling water to said second spray means, a pair of inlets for inlet of chemical reactants into said reaction vessel, a temperature responsive device in the normally liquid containing portion of said tank, a flow control means responsive to said temperature responsive device in one inlet of said pair of inlets, and a ratio flow control device to regulate the rate of flow of liquid in the other of said pair of inlets in a definite ratio to the rate of flow in said one inlet.

3. The assembly of claim 2 wherein the base of said tank is positioned in a body of cooling water.

4. A process for producing a cooled aqueous ammonium phosphate fertilizer comprising separately introducing liquid ammonia, water and phosphoric acid into a first zone and therein mixing these materials whereby the produced aqueous ammonium phosphate becomes heated to a higher temperature than the temperature of the ammonia, water and phosphoric acid prior to mixing, dividing this heated aqueous ammonium phosphate into two portions, flowing one portion down the inner wall of a second zone, flowing cooling water down the outer wall of said second zone in indirect heat exchange with the downflowing aqueous ammonium phosphate whereby the downflowing aqueous ammonium phosphate becomes cooled to a temperature intermediate the temperature of the original ammonia, water and phosphoric acid and said higher temperature, injecting the other portion of said heated aqueous ammonium phosphate into the cooled aqueous ammonium phosphate in said second zone thereby agitating same, passing a portion of the cooled, agitated liquid contents of said second zone into said first zone to minimize said higher temperature, regulating the rate of introduction of liquid ammonia into said first zone in response to temperature of the liquid contents of said second zone, regulating the rates of introduction of water and of phosphoric acid into said first zone in predetermined ratios with respect to the introduction of said ammonia into said first zone, and withdrawing the remainder of the cooled, agitated liquid contents of said second zone as product.

References Cited in the file of this patent

UNITED STATES PATENTS

| | | |
|---|---|---|
| 1,817,232 | Buhrig | Aug. 4, 1931 |
| 2,037,706 | Curtis | Apr. 21, 1936 |
| 2,332,527 | Pyzel | Oct. 26, 1943 |
| 2,450,095 | Seebold | Sept. 28, 1948 |
| 2,707,676 | Picot et al. | May 3, 1955 |
| 2,857,262 | Graham | Oct. 21, 1958 |
| 2,859,105 | Moyrand et al. | Nov. 4, 1958 |
| 2,890,937 | Bresee | June 16, 1959 |